March 4, 1941.     I. H. JEWELL     2,233,981
FILTER
Filed May 3, 1940     2 Sheets-Sheet 1

Inventor:
Ira H. Jewell
By John Howard McElroy
his Atty.

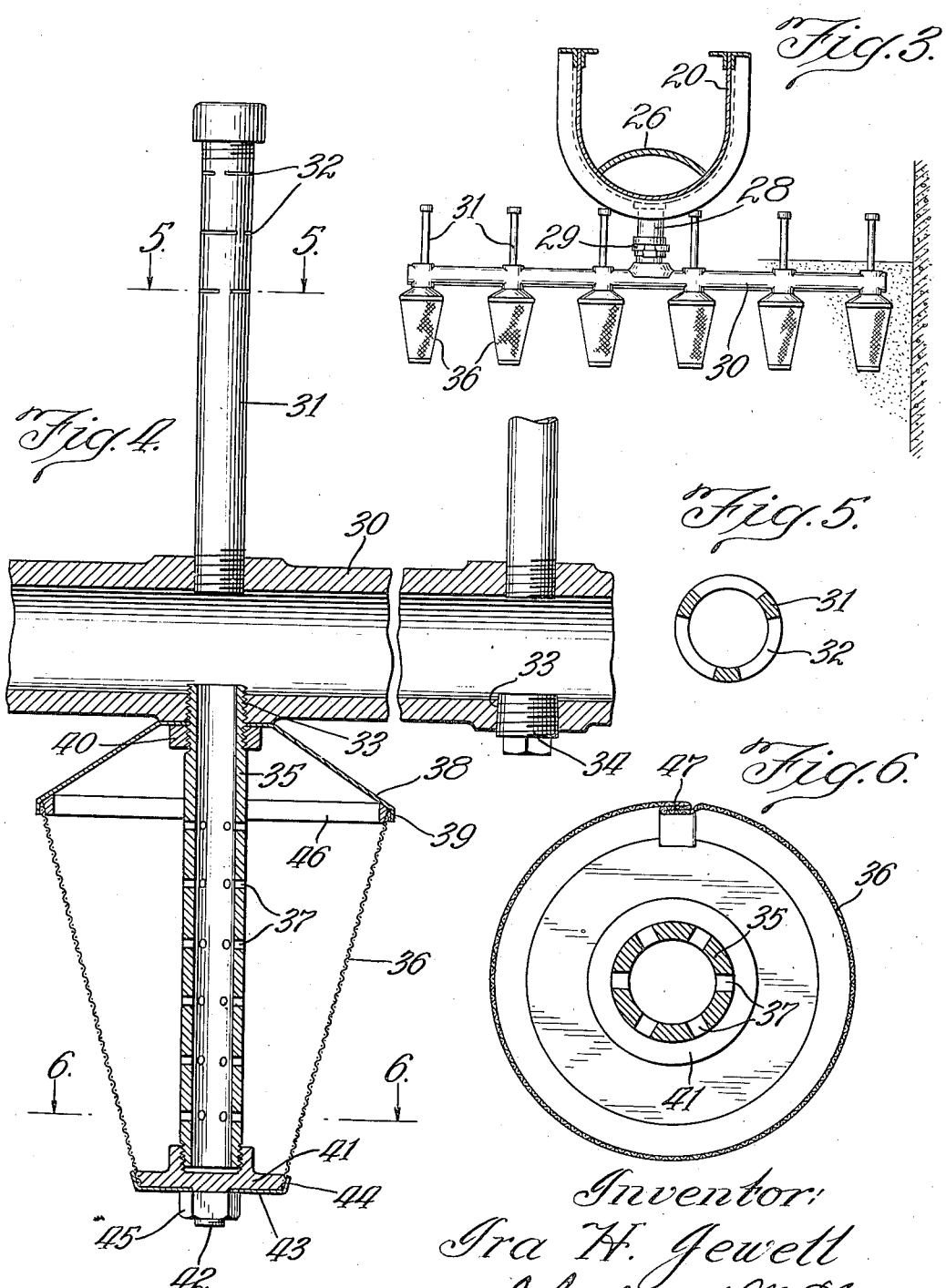

Patented Mar. 4, 1941

2,233,981

UNITED STATES PATENT OFFICE 2,233,981

FILTER

Ira H. Jewell, Evanston, Ill.

Application May 3, 1940, Serial No. 333,169

8 Claims. (Cl. 210—130)

My invention is mainly concerned with large scale filtration, such as is employed for municipal filters, and is designed to produce a novel structure whereby the novel method of washing the sand or other similar filtering material, described in my application No. 121,676, filed January 21, 1937, may be carried out.

It is further concerned with the specific construction of the submerged screens which may be employed to increase its filtering capacity.

To illustrate my invention, I annex hereto two sheets of drawings in which the same reference characters are used to designate identical parts in all the figures, of which—

Fig. 3 is a section on an enlarged scale on the line 3—3 of Fig. 1;

Figure 1:
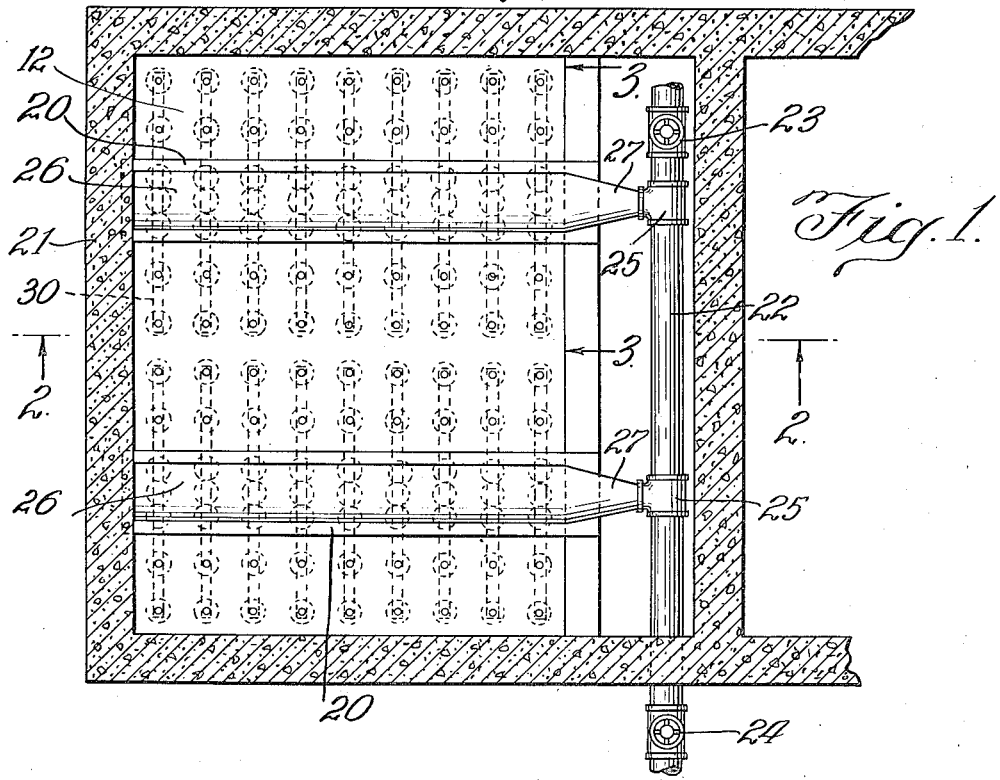
Fig. 1 is a top plan view of a filter bed employing my invention.

Fig. 4 is an enlarged view in vertical section through one of the screen members, and showing an associated washing tube in elevation; and Figs. 5 and 6 are enlarged details in section on the lines 5—5 and 6—6, respectively, of Fig. 4.

Where my invention is employed in large filter beds, such as are usually grouped together in municipal filters, I employ the customary chamber 10, which has on its bottom the customary gravel bed 11, on which the sand bed 12 is supported in the customary manner, and with the gravel bed having therein the customary supply of perforated tubes 13 connected by the T's 14 to the common outlet pipe 15 in the bottom of the chamber 10, which pipe has connections 16 through the bottom of the chamber to the piping 17, which will be connected in any suitable manner, as for instance as is shown in my aforesaid application No. 121,676, with a clear water flume through which the filtered water is delivered as it is filtered to a reservoir, and also with a source of wash water under any desired pressure, valve mechanism, of course, being employed so that water supplied to the top of the bed can be drawn off as filtered, or wash water under pressure can be admitted to the bottom of the bed through the pipes 13 so that the wash water rising uniformly throughout the bed will expand and elevate the upper portion of the sand so it can be washed as hereinafter explained.

The unfiltered water flume 18 has on the top of the partition 19 forming one side of it, a pair of U-shaped recesses into which fit one end of the U-shaped troughs 20, the other ends of which fit into and are closed by the wall 21, so that water to be filtered rising in the flume 18 would enter the troughs 20 and overflow onto the sand bed 12, through which it passes slowly in filtering, and is drawn off through the pipes 13, 15 and 17. During the washing process, in which the movement of the wash water is just opposite to that of the water being filtered, the wash water rises to the top of the troughs 20, spills over into them and runs out into the flume 18, carrying with it whatever impurities have been removed from the expanded sand bed, the troughs 20 being inclined toward the flume, as seen, to facilitate this movement. So far, the construction and mode of operation described are substantially those customarily employed in municipal filtration plants prior to my inventions.

Figure 2:
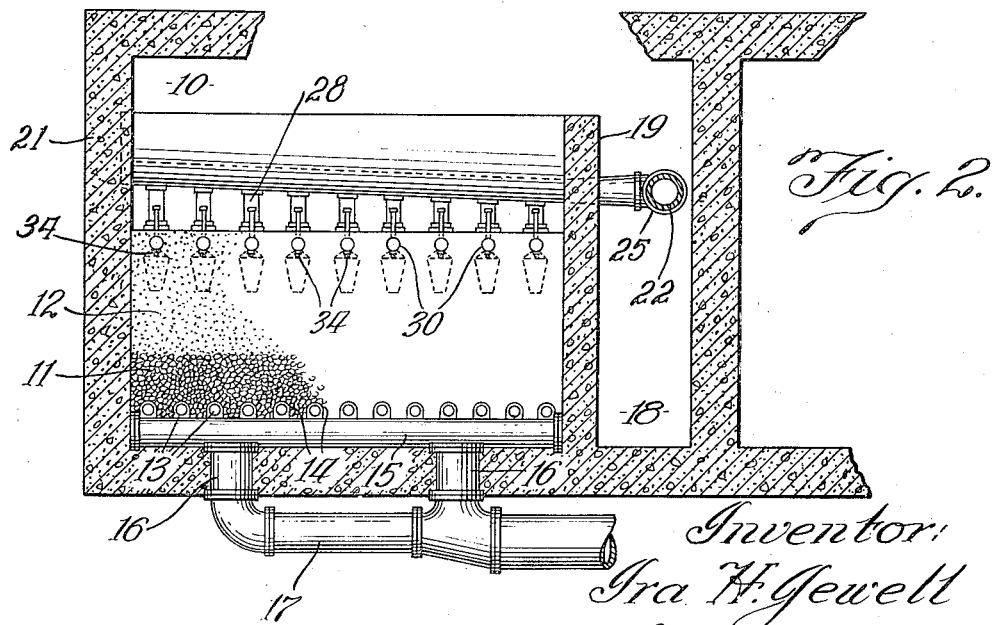
Fig. 2 is a vertical section of the same on the line 2—2 of Fig. 1.

With my invention, I have provided a pipe 22, with valves 23 and 24 therein, so that by opening one and closing the other, or vice versa, it will furnish either water to be filtered, or wash water under pressure. To T's 25 therein, I connect pipes 26, which may be of a peculiar construction, in that the part 27 directly connected to the T's 25 flares, as shown, and is connected to the main body of the tube 26, which, as seen in Fig. 3, is formed by the lower part of the trough body 20 to which is welded, or otherwise secured, the curved, preferably sheet metal, top portion extending the length of the trough and having a closed end formed by the wall 20 to which it is secured, the resulting tube 26 being oblong in its effective cross section. In the bottom of the trough, I secure at intervals the short tubes 28 which in turn are secured by connections 29 to the central portion of the transverse tubes 30, the short tubes 28 preferably being of different lengths, so that all the transverse tubes 30, which are preferably arranged in parallel relation, will lie at the same shallow depth in the sand bed 12. These tubes 30 are closed at their ends and have the vertical tubes 31 screwed into them at preferably regular intervals. Near their upper ends, I form in said tubes 31 the slots 32, preferably arranged as shown in Fig. 5, with three slots in the same plane, and preferably in three planes, but with angular locations different in the adjacent planes, as seen in Fig. 4. I preferably form in the tubes 30, preferably directly beneath the tubes 31, the threaded apertures 33, which may be closed by the plugs 34, as indicated in full lines in Fig. 2, or in one place in Fig. 4, or by the pipes 35 and the attached screens 36, as seen in Figs. 3 and 4, and as hereinafter more fully explained, the screens 36 being employed when it is desired to increase the filtering capacity without enlarging the sand bed area, as explained at length in my aforesaid application No. 121,676.

If the screens 36 are not employed, the washing action will be as follows: Sufficient wash water is admitted through the pipes 17, 15 and 13 to raise the water level and expand the sand until the top of the expanded sand reaches say to the lowermost slots in the pipes 31, or substantially so. While the sand is so expanded and kept expanded by the rising wash water, the valves 23 and 24 are so manipulated as to furnish an additional supply of wash water under pressure to all the pipes 30, and so to the pipes 31, from the slots 32 of which water is squirted in all directions with sufficient force to meet that coming from the slots of the surrounding tubes 31, so that as a result the loosened and expanding sand, almost floating, as it were, in the water, is scoured by attrition and all possible foreign matter loosened therefrom. What with the water from below and that added from the pipes 31, the water rises rapidly enough to carry all foreign matter in suspension and spill it over into the troughs 20 whence it is carried off in the manner in which wash water is usually disposed of.

I have described the apertures 33 as formed in the pipes initially, and closed by the plugs 34, as in some instances filters, as initially constructed, will have sufficient capacity from the sand bed without the screens 30, which can be subsequently readily added by removing the plugs 34 when the growth of the municipality makes the greater capacity secured by their use necessary.

In Figs. 4 to 6, I have shown specific improvements over the specific screen structures shown in the aforesaid application No. 121,676. I thread both ends of the tube 35, which will have the customary holes 37 therein, through which the wash water under pressure is driven in jets against the interior of the screen to clean it. I preferably form the imperforate top 38 of sheet metal, preferably in the form of a rather flat cone, and with its rim 39 turned down, it being held in place by the nut 40, as will be readily seen. An imperforate bottom piece 41, having a threaded projection 42 on its under side, is screwed onto the lower end of the tube 35, and a bottom disk 43, preferably formed of sheet metal and with an upturned rim 44, is held over it by the nut 45. A ring 46, with its upper outer surface having the same angle as that of the top 38, and with its lower outer surface having the same angle as that of the screen 36, which is preferably of the truncated conical shape shown, and is rolled into the shape shown with the edges joined, by the lock seam 47, serves to stiffen the rim of the top 38, and the top of the screen 36 is held between the ring 46 and the downturned rim 39, and preferably brazed or otherwise secured in place. The bottom of the screen 36 is similarly held between the periphery of the bottom piece 41 and the rim 44 of the bottom disk 43, which have the same angle to the vertical as the screen 36. The ring 46 and the bottom piece 41 will have recesses (not shown) in their peripheries of the proper size and shape to accommodate the seam 47 of the screen 36.

In washing, as in filtering, the action of the screens 36, if they are employed, is the same as fully described in the aforesaid application No. 121,676.

While in filtering to full capacity, I manipulate the valves 23 and 24 so that a supply of water to be filtered flows through the tubes 26, 28 and 30 to the tubes 35 and out through the screens 36, I may obtain much the same effect (unless the water thus passed through the tubes 26, 28 and 30 is under a greater head than that passing down through the surface of the sand) by closing both the valves 23 and 24, in which case some of the water standing above the sand bed will by gravity enter the slots 32 and pass on down through the tubes 31 and 35, and out through the screens 36, utilizing the filter possibilities of the sand surrounding the screens, in addition to that of the surface layer. The slots 31, being narrow to prevent sand passing through them, will limit the amount of the additional capacity secured in this way unless their total area equals that of the internal cross sections of the tube 35.

While I have shown and described my invention as embodied in the form which I at present consider best adapted to carry out its purposes, it will be understood that it is capable of modifications, and I do not desire to be limited in the interpretation of the following claims, except as may be necessitated by the prior art.

What I claim is new, and desire to secure by Letters Patent of the United States is:

1. In a filter unit, the combination with a filter chamber provided with inlet means, and effluent means throughout the bottom thereof, of a bed of filtering material therein, piping extending throughout said chamber for carrying wash water thereto, and pipes closed at their free ends extending vertically from said piping throughout said bed at frequent intervals, said pipes having openings in the sides thereof located above the level of the bed when the water is being filtered therethrough, and serving when the bed is being washed by water rising therethrough from the effluent means, to spray additional wash water horizontally upon the layer of the filtering material expanded by water rising from said effluent means.

2. A filter unit as described in claim 1, in which the pipes, circular in cross section, have the openings formed by narrow horizontal slits.

3. A filter unit as described in claim 1, in which the piping consists of parallel series of horizontal pipes embedded in the filtering material somewhat below the surface thereof with the pipes opening into the upper sides thereof.

4. As a new and useful filter unit, a generally U-shaped overflow trough having a partition toward the bottom thereof, forming a tube for carrying wash water, parallel pipes closed at their ends extending transversely of the trough beneath it, connections between the tube and each of the pipes, and spray members extending upward from each of the pipes at intervals.

5. A filter unit as described in claim 4, in which the spray members consist of vertical tubes closed at the upper ends with their lower ones opening into the pipes and having openings in the sides thereof for the purpose described.

6. A filter unit as described in claim 1, in which filter screen members are provided opposite the pipes and opening in the under sides of the piping.

7. A filter screen member consisting of a perforated pipe having an imperforate disk with a downturned rim secured on its upper end, a bottom piece secured on its lower end and closing it, a bottom disk secured on the bottom piece having an upturned rim, with a ring fitting into the downturned rim of the top disk, and a generally cylindrical screen having its upper edge held between the ring and the downturned rim of the disk and its lower end held between the bottom piece and the upturned rim of the bottom disk.

8. A filter screen member consisting of a perforated pipe threaded at its top and bottom and having an abutment thereon near said top, an imperforate disk with a downturned rim and central aperture fitting over the top of the pipe and resting on the abutment, a connection threaded onto the top of the pipe and serving to clamp the disk between it and the abutment, a ring fitting into the turned-down rim of the disk, a bottom piece threaded onto the lower end of the pipe and having a threaded extension, a bottom disk with a turned-up rim and fitting over the bottom piece and held in place by a nut screwed onto the extension, and a generally cylindrical screen having its upper edge held between the ring and the downturned rim of the disk, and its lower rim held between the bottom piece and the upturned rim of the bottom disk.

IRA H. JEWELL.